United States Patent [19]

Hendrickson

[11] 4,412,338
[45] Oct. 25, 1983

[54] FREQUENCY SHIFT KEYED DETECTOR SYSTEM

[75] Inventor: Max S. Hendrickson, Forest Lake, Minn.

[73] Assignee: Honeywell Inc., Minneapolis, Minn.

[21] Appl. No.: 306,273

[22] Filed: Sep. 28, 1981

[51] Int. Cl.[3] .............................................. H03D 3/18
[52] U.S. Cl. ...................................... 375/82; 329/105
[58] Field of Search ............... 307/511, 516, 523, 526, 307/353; 328/134; 329/50, 105, 122, 131; 375/80, 82; 340/825.71, 825.73; 364/484

[56] References Cited

U.S. PATENT DOCUMENTS

| | | | |
|---|---|---|---|
| 3,439,283 | 4/1969 | Danielson | 329/105 |
| 3,555,428 | 1/1971 | Perreault | 325/320 |
| 3,559,083 | 1/1971 | Crouse | 329/104 |
| 3,660,771 | 5/1972 | Balugani et al. | 329/104 |
| 4,021,744 | 5/1977 | Montefusco | 375/82 |
| 4,079,329 | 3/1978 | England et al. | 329/122 |

Primary Examiner—Benedict V. Safourek
Attorney, Agent, or Firm—Charles G. Mersereau

[57] ABSTRACT

A method of and apparatus for discriminator FSK signals using a tri-state phase detector is disclosed in which an input of known frequency is combined with the unknown FSK signal input and the output is fed to an integrator only after the minimum clearing time of the tri-state during each bit period. The integrator receives only the cleared signal for use in binary data signal determination thereby overcoming problems associated with lack of initial phase information at the tri-state phase detector.

5 Claims, 2 Drawing Figures

FREQUENCY SHIFT KEYED DETECTOR SYSTEM

BACKGROUND OF THE INVENTION

1. Field of the Invention

The present invention relates generally to communication systems utilizing a frequency shift keyed technique and more particularly, to an improved detection system using a tri-state phase detector.

2. Description of the Prior Art

Many communication systems including those which utilize existing power lines use digital modulation techniques in signal transmission. One method of digital transmission is phase shift keyed (PSK) transmission. In PSK systems, the phase of the carrier wave is shifted by 180 degrees to indicate in binary a "mark" or "1" and transmitted without shifting to indicate a space or a "0". Another digital transmission technique which is becoming more important involves frequency shift keyed (FSK) modulation. This is the type employed in the present invention. In this type of a system, one frequency is used to indicate a "mark" or "1" and another distinct frequency to indicate a space or "0". Frequency shift keying involves the modulation of the base or carrier frequency to shift that frequency by predetermined increments in response to particular data to be transmitted.

In a frequency shift keying system, the frequency shift phase is continuous, i.e., the transmitted signal is a sinusoidal signal which varies in frequency but has no time phase shift continuity. Normally, a binary "1" or a "mark" signal is transmitted at a frequency above a selected center or carrier center frequency or "carrier Plus" frequency and a space or binary "0" is transmitted at a frequency below the center frequency of the carrier or "carrier minus" frequency. In such systems the differential between a transmitted, and thus received frequency, and the center frequency of the carrier may be made equal to or greater than the modulation rate, also known as the data rate, or bit rate, divided by two.

Systems for receiving frequency shift keyed transmission signals are well-known. Such systems must discriminate accurately between the carrier minus and carrier plus frequencies and reject spurious or "noise signals" which also may be transmitted. Many techniques and schemes have been used in the prior art in an attempt to achieve better, more accurate signal discrimination. These include the use of various input logic schemes in conjunction with bandpass filters, or the like to check for the presence or absence of certain frequencies.

In the prior art, in order to achieve commercially feasible reliability, most discriminator schemes have had to be quite complicated. There has long been a need for simplification of these systems so that inexpensive reliable units would be available. It would be desirable to employ a system using a tri-state phase detector in conjunction with an integrating circuit, the output of which would be used as the input to a comparator which, in turn, would be utilized to activate a latch or other signal utilization means. In the prior art, however, it has been difficult, if not impossible, to provide reliable FSK discrimination using a tri-state detector in combination with an integrating circuit because of the lack of phase information between the output of the tri-state and the bit time. Thus, if the phase relationship is unknown, at least part of the information fed to the integrating circuit can be wrong and this, of course, can lead to a misinterpretation of the input data signal.

SUMMARY OF THE INVENTION

By means of the present invention, the problems associated with the use of a tri-state phase detector in conjunction with an integrating circuit to produce reliable FSK signal discrimination are solved by the provision of a method and apparatus which overcomes the drawbacks associated with the tri-state phase detector occasioned by lack of phase information between the input FSK signals and the known or reference signal input to the tri-state phase detector. It has been found that if a reference signal of known frequency, which may be the carrier frequency in an FSK system, and an unknown frequency which may be a carrier plus or carrier minus frequency are used as the inputs to a tri-state phase detector, after the signals undergo a phase crossing the signal confusion will clear. An output consisting of all positive pulses or all negative pulses depending on whether the known input frequency is higher or lower than the known reference frequency will be produced after such a phase crossing by the two input frequencies. If a "worst case condition" is assumed, such a frequency phase crossing occurs at least once in the "worst case time" or minimum clearing time. This time will be as follows:

$$\text{Min. Clear Time (sec.)} = \frac{1}{\text{diff. between } F_{ref} \text{ and } F_{unk}}$$

The present invention provides a method and apparatus for operating the tri-state phase detector in conjunction with an integrating circuit in a manner which assures that the tri-state phase detector has cleared prior to enabling the integrater circuit to integrate the FSK tri-state phase detector output. At the start of each bit period or FSK modulation period, integration is not allowed to begin until the passage of an interval equal to or greater than the minimum clearing time. In this manner, the integrater will always be loaded with "cleared data" from the tri-state phase detector thereby eliminating errors produced by initial undesirable phase relationships between the input frequencies.

In the preferred embodiment the output of the integrater is fed to a comparator circuit which determines from the voltage level of that signal whether a digital "1" or a "0" has been transmitted. This, in turn, is fed to a data latch or other signal utilization device for use in a well-known manner. The timing information to operate the system may also be derived in any conventional manner. The data timing, i.e. the Baud rate or bit time of the FSK system is known, and the carrier, carrier plus and carrier minus frequencies are known. Thus, for example, the reference frequency and timing signals may be derived from an oscillator operating on the input from the known sixty cycle power line frequency utilizing frequency synthesizers.

BRIEF DESCRIPTION OF THE DRAWING

In the drawing wherein like numerals are utilized to designate like parts throughout the same.

DESCRIPTION OF THE PREFERRED EMBODIMENT

Figure 1:
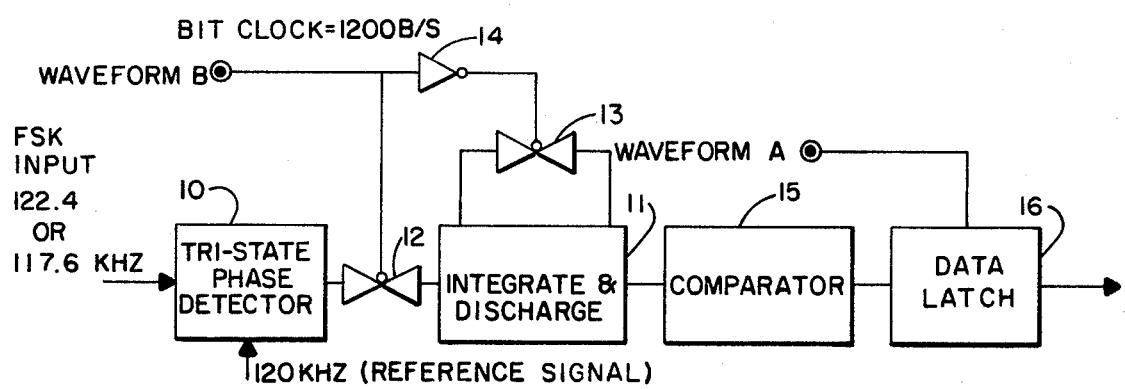
FIG. 1 is schematic block diagram of the FSK discriminator of the invention.

FIG. 1 depicts the improved FSK discriminator system in accordance with the present invention in schematic block form. This includes a tri-state phase detector 10, which may be similar to the one used in the well-known integrated circuit, the 4046B which is available from several manufacturers, an integrate and discharge circuit 11, sometimes referred to as an "integrate and dump circuit" with associated input and output controls including switches 12 and 13 and an inverter or NOT gate 14. Which may be a data latch 16.

The system is shown using an arbitrarily chosen 120kHz reference signal input to the tri-state together with FSK signals, which may be power line carrier FSK signals, including a 122.4 kHz carrier plus or "mark" signal indicating a binary "1" and a 117.6 kHz carrier minus input frequency of "space" signal indicating a binary "0" to the tri-state phase detector. The 120 kHz reference signal input may be obtained in any well-known manner, as from an frequency synthesized signal derived from normal 60 Hz AC power line input. Likewise the timing signals for the control input to the integrater system (shown as waveform B) and the data latch (shown as waveform A) may be similarly derived as by using frequency synthesized techniques in conjunction with the 120 kHz oscillator system in a well-known manner.

In accordance with the present invention, if a reference frequency is used for one input and unknown frequency for the other input, the output of the tri-state phase detector, after it has been cleared, will consist of all positive pulses or all negative pulses, depending on whether the unknown frequency is higher or lower than the reference frequency. Thus, if it is higher, positive pulses will occur and, if lower, negative pulses will appear in the output. Clearing of the tri-state phase detector occurs each time the unknown and reference input waveforms coincide in phase. The time that it takes to clear the tri-state phase detector, then, depends on both the initial phase difference of the two frequencies and the amount of frequency difference or deviation between them. In order to build a reliable FSK detector using a tri-state phase detector, it must allow for the worst case conditions. Thus, the system must assume that the two signals initially are out of phase by almost an entire cycle or 359+ degrees. Based on this assumption, the minimum clearing time can be derived from the frequency differences between the reference frequency and the unknown frequency as follows:

$$\text{Min. Clear. Time (seconds)} = \frac{1}{\text{dif. between } F_{ref} \text{ and } F_{unk}}$$

using the input frequency associated with FIG. 1, this yields:

$$\text{Min. Clear. Time (seconds)} = \frac{1}{122.4\text{kHz} - 120.0\text{kHz}} = \frac{1}{2400} \text{ sec.}$$

In the case of power line carrier communications, data timing information is known. The Baud rate or digital bit time may be, for example, equal to one-half the frequency difference between the carrier plus or carrier minus signal frequency and the reference frequency of 1.2 kHz. It can readily be seen that the minimum clearing time equals one-half the bit time or Baud rate. Therefore, by controlling the operation of the integrater 11 by means of switches 12 and 13 together with NOT gate 14, the integrater may be caused not to integrate for an amount of time equal to the minimum clearing time at the beginning of each bit time, to assure that only cleared pulses will be integrated.

Figure 2:
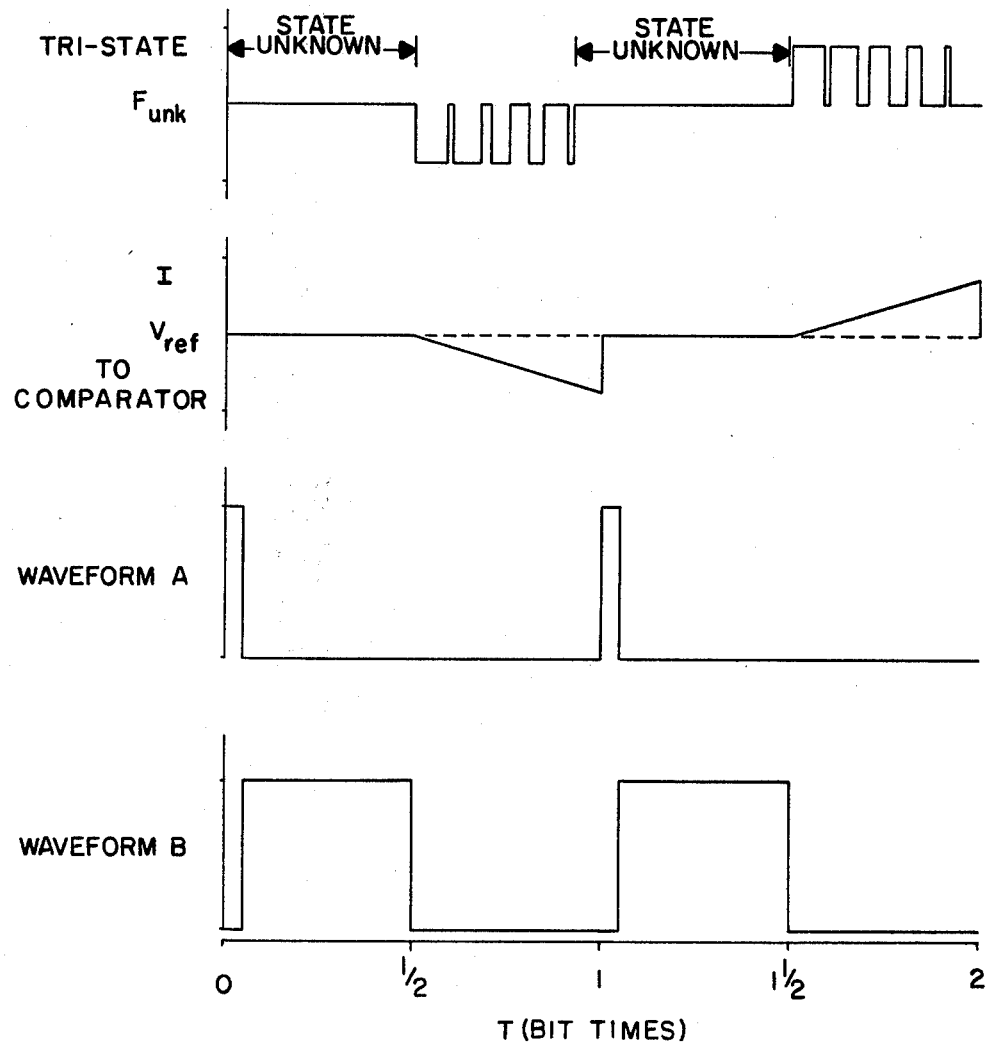
FIG. 2 is a graphical representation of the waveforms associated with the components of FIG. 1 over a two bit time period.

The operation of the system is better illustrated utilizing the waveform diagrams in accordance with FIG. 2. In that figure the integrater circuit is shown to integrate either down or up, depending upon whether negative or positive pulses are received from the tri-state phase detector. Integration takes place only during the last half of the bit period. In other words, any given bit period, then, the output of the tri-state phase detector does not become an input to the integrater during the minimum clearing time. After the minimum clearing time has elapsed, switches 12 and 13 are reversed and the integrater 11 begins to integrate the pulse signals from the output of the tri-state phase detector 10. The integrater output is fed to the comparator 15 which is, in turn, a voltage level detector having a digital 1 or 0 output depending on whether a positive or negative integrated signal above or below a certain level is received from the integrater 11. The output of the comparator 15 is fed to the data latch 16 which latches the appropriate digital 1 or 0.

The timing of the output is controlled by waveform A going high at the end of each bit period. Waveform A then goes low and waveform B goes high switching the switches 12 and 13 and disabling the integrater until the end of another minimum clearing time during the ensuing bit period. In the diagram of FIG. 2 during the first bit period the data input represents a 0 and during the second illustrated period a 1 in the FSK logic input.

It can readily be seen that the integrator, then, receives only cleared pulses from the tri-state phase detector and therefore the chances of digital error in the output of the integrater and, thus, in the output of the comparator are greatly reduced.

The embodiments of the invention in which an exclusive property or right is claimed are defined as follows:

1. A method of discriminating FSK transmitted signals comprising the steps of:
    combining a reference input signal of known frequency with an FSK data input signal of unknown frequency but known bit time in a tri-state phase detector;
    causing a portion of the output of said tri-state phase detector to be integrated in an integrating circuit means and discharged to a means for determining the binary equivalent thereof once each bit time; and
    controlling the integration and discharge function of said integrater circuit means such that the integration function remains disabled for a time at least equal to the minimum clearing time of the tri-state detector before integration is begun during each bit time.

2. An FSK signal discrimination system for detecting input logic signals comprising:
    tri-state phase detector means adapted to receive a reference signal of known frequency and an FSK signal of unknown frequency and having, after the minimum clearing time of the tri-state detector, a cleared output indicative of the FSK input signal during a portion of each given data bit time;

integrating circuit means for integrating the output of said tri-state detector means and producing a discharged output indicative of the FSK input signal for each bit time; control means associated with said integrating circuit means, said control means allowing said integrating circuit means to integrate only the cleared output of said tri-state phase detector.

3. The system according to claim 2 further comprising a comparator means having an input connected to the output of said integrater circuit means and having an output indicative of the binary input of the FSK signal.

4. The system according to claim 3 further comprising:
signal utilization means for receiving the digital signal input from said comparator means; and
control means associated with said signal utilization means for inputting a signal thereto enabling a periodic binary signal output therefrom.

5. The apparatus of claim 2 wherein said control means further comprises timed control switching means for time control of said integrate and discharge function thereof.

* * * * *